US007412758B1

(12) United States Patent
Costa

(10) Patent No.: US 7,412,758 B1
(45) Date of Patent: Aug. 19, 2008

(54) METHOD FOR HINGEDLY COUPLING COMPONENTS WITH ONE ANOTHER

(75) Inventor: Larry J. Costa, Osceola, IN (US)

(73) Assignee: Costa Technologies, Osceloa, IN (US)

( * ) Notice: Subject to any disclaimer, the term of this patent is extended or adjusted under 35 U.S.C. 154(b) by 0 days.

(21) Appl. No.: 11/506,116

(22) Filed: Aug. 17, 2006

Related U.S. Application Data

(63) Continuation of application No. 10/103,188, filed on Mar. 19, 2002, now Pat. No. 7,094,116.

(51) Int. Cl.
*B23P 17/00* (2006.01)

(52) U.S. Cl. .............................. 29/11; 29/418; 29/423; 439/885

(58) Field of Classification Search .................... 29/11, 29/412, 413, 414, 417, 418, 423; 16/226; 439/885, 13

See application file for complete search history.

(56) References Cited

U.S. PATENT DOCUMENTS

| | | | | | |
|---|---|---|---|---|---|
| 3,514,827 | A | * | 6/1970 | Peace et al. | 407/53 |
| 4,339,860 | A | * | 7/1982 | Hayashi | 29/413 |
| 5,182,933 | A | * | 2/1993 | Schick | 72/335 |
| 5,730,608 | A | * | 3/1998 | Legrady | 439/78 |
| 5,862,579 | A | * | 1/1999 | Blumberg | 29/417 |
| 6,083,060 | A | * | 7/2000 | Chen et al. | 439/885 |

* cited by examiner

*Primary Examiner*—Jermie E Cozart
(74) *Attorney, Agent, or Firm*—Holland & Hart LLP

(57) ABSTRACT

The progressive die tooling component carrier is adapted to serve as a hinge connection between the components that it connects. The carrier allows for the reeling of a series of components for storage and transportation without causing the warping or bending of the components. Preferably, the hinge connection is achieved by providing the carrier with a compression, a perforation, or both a compression and a perforation. The carrier is designed to further minimize the scrap resulting from the removal of the carrier from the adjoining components.

13 Claims, 6 Drawing Sheets

METHOD FOR HINGEDLY COUPLING COMPONENTS WITH ONE ANOTHER

CROSS-REFERENCE TO RELATED APPLICATION

This is a continuation application of Petitioner's earlier application Ser. No. 10/103,188 filed Mar. 19, 2002, entitled PROGRESSIVE DIE TOOLING COMPONENT CARRIER now U.S. Pat. No. 7,094,116.

BACKGROUND

Progressive die tooling is used to produce high volume precision components for manufacturing purposes. Progressive die tooling components are used in a number of industries, but are used primarily in mass production. In progressive die tooling, the components to be manufactured can be connected directly to each other in series, but more commonly, such components are connected by a carrier, described below. If, for instance, a series of metal components were to be produced for progressive die tooling, the raw material employed in the process would comprise a strip of metal. The metal would be stamped to provide a series of desired components. The components would ordinarily be connected by a small amount of the metal strip, known as a carrier. The carrier would be removed from the components by a punch or similar tool prior to the implementation of the component.

The design of the carrier is determined by the design of the tooling, the associated component, and the application of the component. To minimize the amount of waste that is produced when the carrier is separated from the component, the carrier is usually joined to the base features of consecutive components.

Prior art progressive die tooling component carriers have customarily comprised a solid piece of metal having the same thickness as the component. In instances where minimization of scrap material has been important, the prior art progressive die tooling component carriers have had a shortened length or width. A carrier with a shortened length prevents reeling of the integrated components because of the rigidity of its connection with the components. Reeling of components having carriers of shortened length can result in bent or warped components, which is undesirable. Similarly, carriers with shortened widths allow for the twisting, or relative rotation, of adjacent components. The twisting of the components makes precision automated work difficult.

Other prior art progressive die tooling component carriers, such as those disclosed in U.S. Pat. No. 5,730,608, teach the use of a pair of rectangular carrier arms, such as the component carrier 5 depicted in FIG. 1C. The carrier arms 6 and 7 are positioned in parallel spaced relation to one another, connecting the adjacent components 8 and 9 to one another. This type of carrier becomes problematic when the adjacent components 8 and 9 are subjected to a twisting motion. The twisting motion forces one end of each carrier arm upward and the opposite end downward forming a pair of hinges A and B in each of the carrier arms, such as those depicted in FIG. 1D, as the components are wound around a reel. Each of the hinges A and B will tend to bend along different axes, thus creating an additional force on the carriers that makes them more likely to fracture as the reeled components are unreeled prior to assembly. Moreover, the formation of multiple hinges in each of the carriers will alter the uniform distance between the components, as depicted in FIG. 1E, making precision positioning of the components more difficult.

The difficulty in forming a single hinge in such prior art carriers is further compounded by the inability to accurately determine the point at which each carrier will bend. The components are far more likely to become entangled as they are wound onto a reel when each of the carriers is hinged at a different point. Consistently locating the hinge point of each carrier will greatly reduce the occurrence of tangled components as well as multiple axes hinging.

Accordingly, what is needed is a progressive die tooling component carrier that enables a strip of formed components to be easily wound onto a reel, resists twisting of the components relative to one another, and reduces the scrap formed when the carrier is separated from the components.

SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

The progressive die tooling component carrier of this invention is adapted to create and accurately locate a single hinge between the components that it connects. Therefore, the carrier of the present invention allows for the reeling of a series of components for storage and transportation without causing the reeled components to tangle, warp or bend.

In one embodiment of the present invention, a hinge connection is achieved between adjacent components by providing a compression in the carrier. In another embodiment, the hinge connection is achieved by forming a shaped perforation in the carrier. The compression and the perforation methods are combinable into yet another embodiment. Each of these different embodiments provides the additional benefit of reducing the amount of waste material produced when the carrier is separated from the components.

It is therefore an object of this invention to provide a progressive die tooling component carrier that provides a hinge connection between the components to which it is connected.

It is a further object of this invention to provide a progressive die tooling component carrier that allows for the reeling of a series of components without causing the tangling, warping or bending of the components.

It is yet another object of the invention to provide a progressive die tooling component carrier that results in the minimization of waste material produced when the carrier is severed from the component to which it is attached.

It is a further object of the invention to provide a progressive die tooling component carrier that substantially prevents relative rotation of the components about their longitudinal axes.

It is yet another object of the invention to provide a progressive die tooling component carrier that is shaped to prevent the formation of multiple hinges between pairs of adjacent components.

It is a further object of the invention to provide a progressive die tooling component carrier that forms a hinge at a predetermined location along the length of the carrier.

These and other objects of the invention will be apparent to those familiar with the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

Figure 1A:
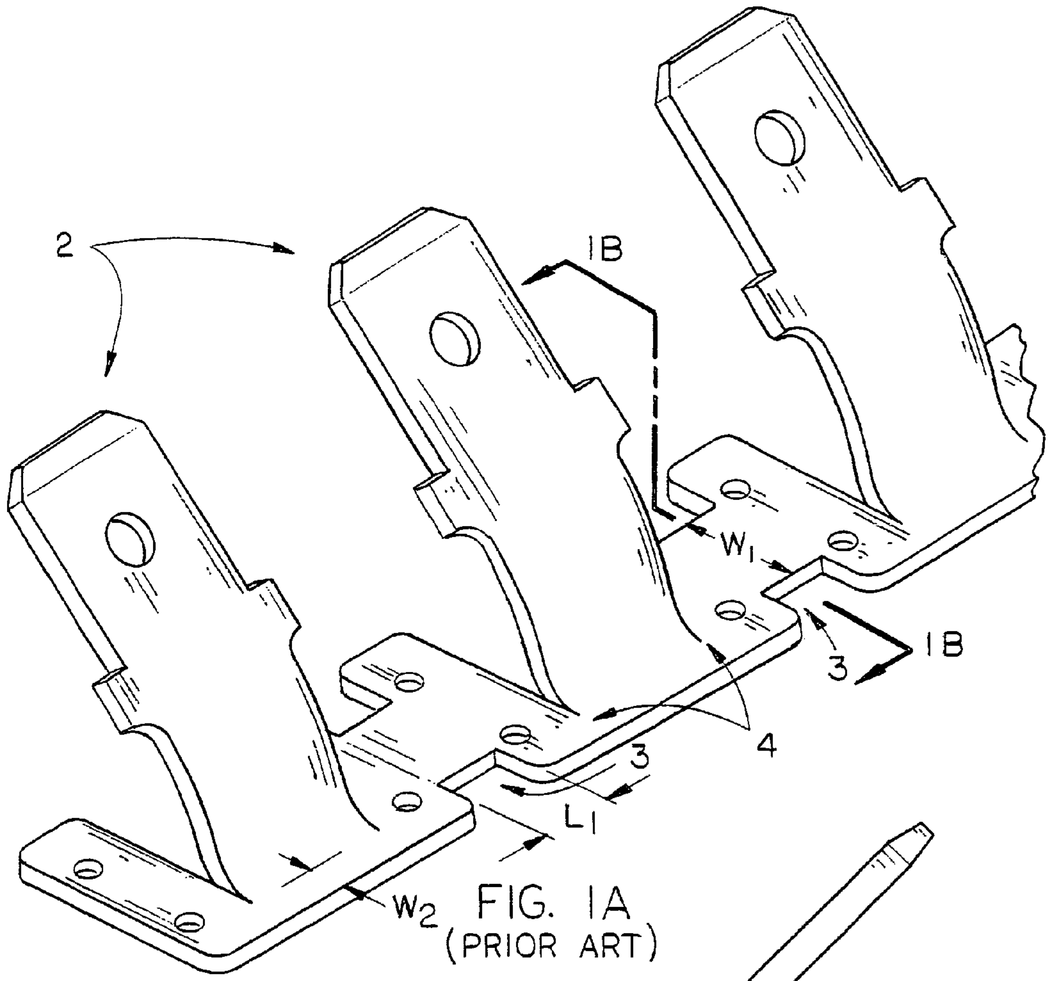
FIG. 1A (PRIOR ART)
FIG. 1A is an isometric view of a series of components joined by prior art progressive die tooling component carriers.
Figure 1B:
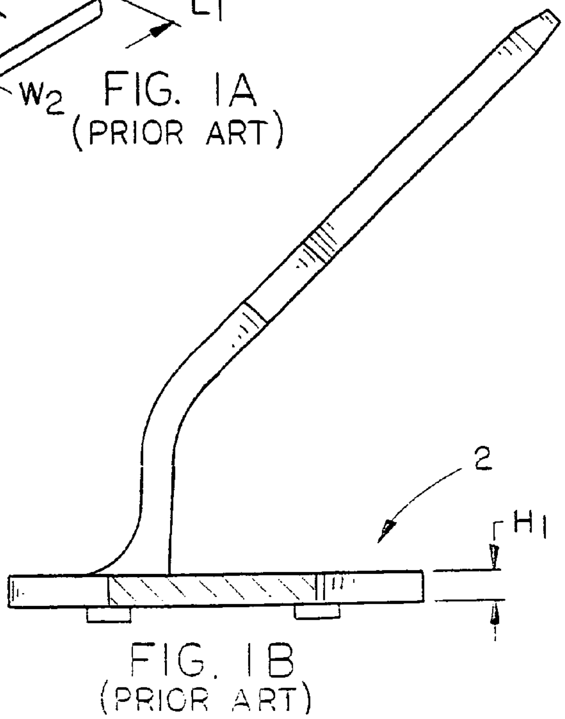
FIG. 1B (PRIOR ART)
FIG. 1B is a side sectional view of the same.
Figure 1C:
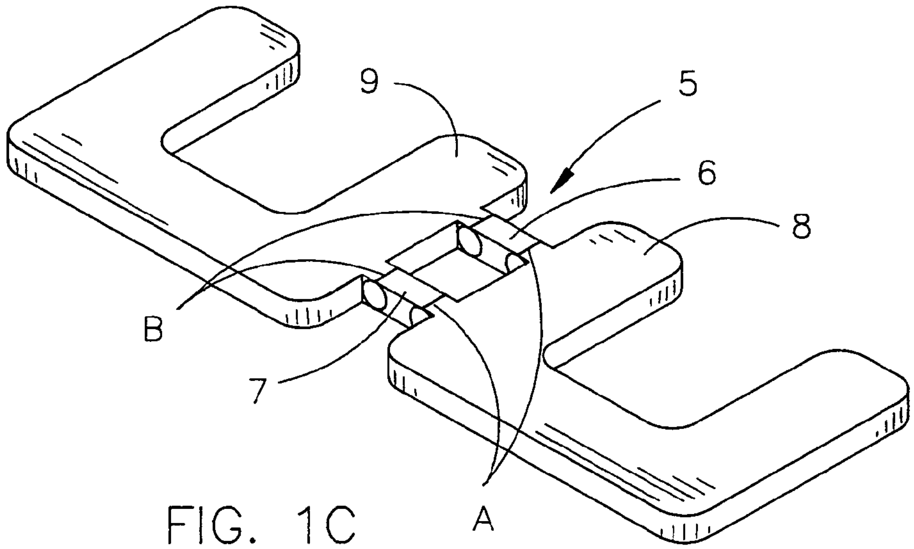
FIG. 1C (PRIOR ART)
FIG. 1C is an isometric view of a series of components joined by an alternate prior art progressive die tooling component carrier.

The numeral 2 indicates prior art progressive die tooling components having prior art progressive die tooling component carriers 3 therebetween. Although the progressive die tooling components 2 shown are electrical terminals, the structure of this invention may be used with any progressive die tooling components. As seen in FIGS. 1A and 1B, the prior art carriers have a length ($L_1$), width ($W_1$), and thickness ($H_1$). The thickness ($H_1$) of the prior art progressive die tooling component carriers 3 is equivalent to the thickness of the prior art progressive die tooling components 2 as shown in FIG. 1B.

The prior art progressive die tooling component carriers 3 have several shortcomings. It is often desirable to reel the progressive die tooling components 2 for transportation or storage. The prior art progressive die tooling component carriers 3, as shown in FIG. 1A, occasionally have a width ($W_1$) that is greater than the width ($W_2$) of the component 2. The reeling of the prior art progressive die tooling components 2 places stress on the components orthogonal to the longitudinal axis of the components. The integrated components 2 and prior art carriers 3 tend to deflect or bend at their weakest points. As shown in FIG. 1A, the weakest point in the integrated carriers and components would likely be the point indicated by numeral 4. If, however, the width ($W_1$) of the prior art progressive die tooling component carrier 3 were made smaller than the width ($W_2$) of the component, the components 2 would be subject to twisting or relative rotation about the longitudinal access of the components. Such rotation is undesirable in precision tooling.

Furthermore, the length ($L_1$) or the width ($W_1$) of the prior art carriers 3 has often been minimized to reduce the amount of waste material in a die tooling operation. Although the reduction of waste is an important goal, as previously stated, reduction of the width ($W_1$) of the prior art carriers 3 results in the potential twisting of the components 2. In addition, reduction of the length ($L_1$) of the prior art carriers 3 results in greater stress on the components 2 at their weakest points 4 when the components are reeled for transportation or storage.

Figure 2A:
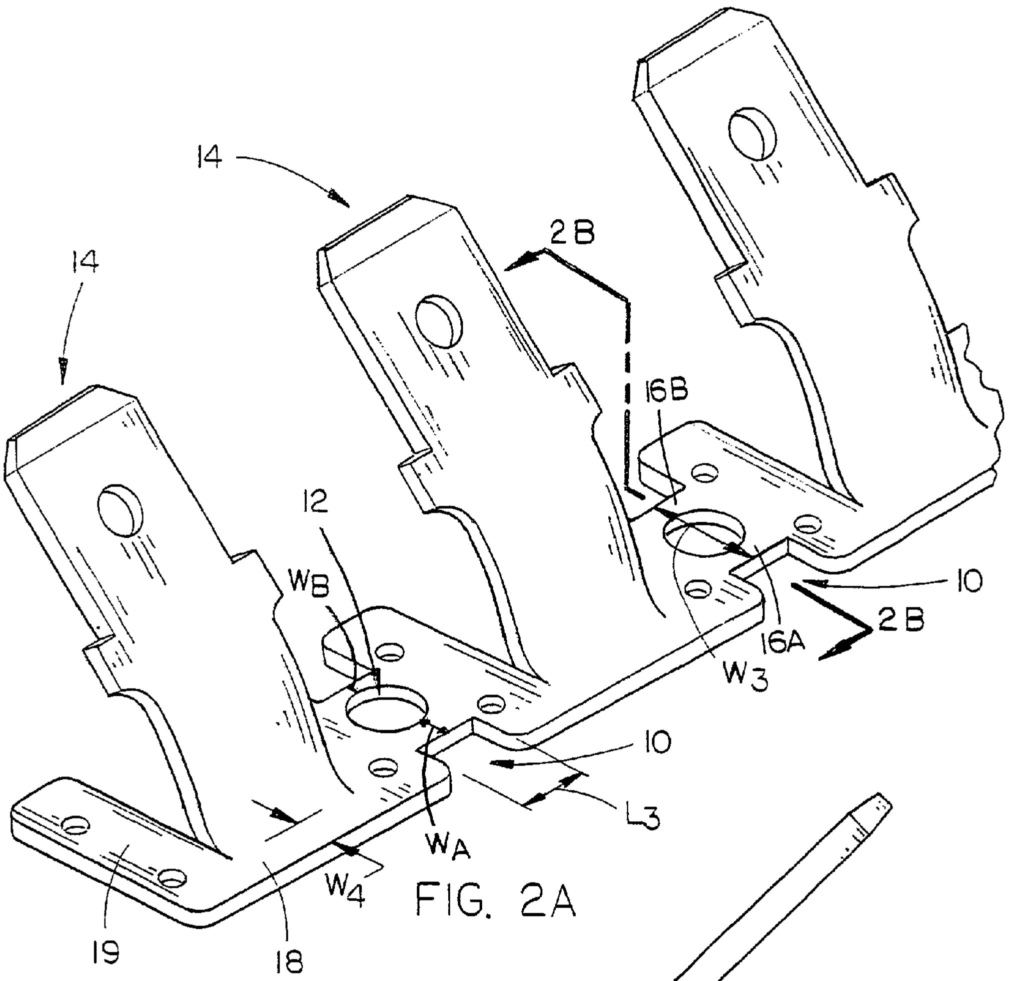
FIG. 2A is an isometric view of a series of components joined by the progressive die tooling component carriers of this invention employing a perforation.
Figure 2B:
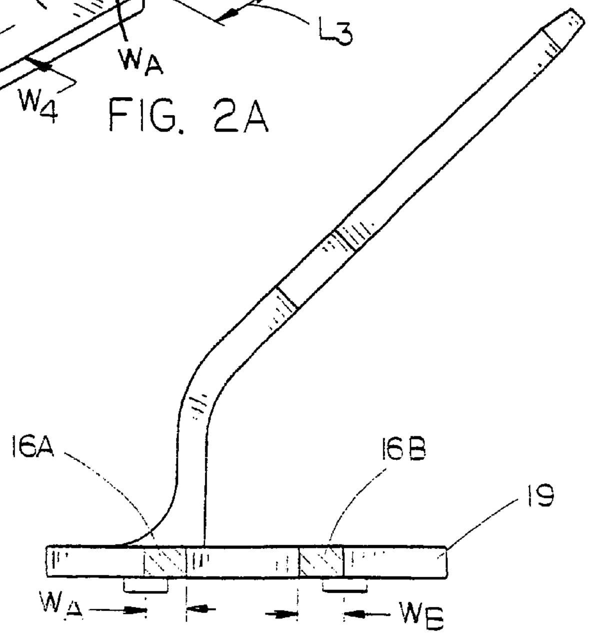
FIG. 2B is a side sectional view of the same.

The numeral 10 refers generally to an embodiment of the progressive die tooling component carrier of this invention. As shown in FIG. 2A, the carrier 10 has a length ($L_3$) and a width ($W_3$). The carrier 10 is shaped to also include a perforation 12. The width ($W_3$) of the carrier 10 is sufficient to prevent the twisting of the components 14 relative to one another. Preferably, the carrier arms 16A and 16B have a combined width at their narrowest points ($W_A+W_B$) that is less than the width ($W_4$) of the component 14 at its narrowest point 18 in order to prevent twisting or bending of the component 14.

In use, the carrier 10 is separated from the components 14 in conventional fashion, usually by a punch. It is preferred that the carrier be completely separated from the adjoining components. Leaving small portions of the carrier attached to the components will result in an uneven component edge. The uneven edge will often render the component incompatible with glass or ceramic substrates. The uneven edge causes stress points on the substrate when the solder used to connect the component to the substrate cools.

The carrier 10, once separated, constitutes waste. It is preferred that the perforation 12 extends across the length ($L_3$) of the carrier 10 so that the perforation 12 exposes a portion of the component edge. This will help minimize waste in at least two different ways. First, the perforated carrier will comprise less material than a non-perforated carrier. Second, the carrier will be broken into two or more smaller pieces as it is removed from the adjoining carriers, or is more easily folded into a smaller form, allowing for easier removal by conventional vacuum methods.

Figure 1D:
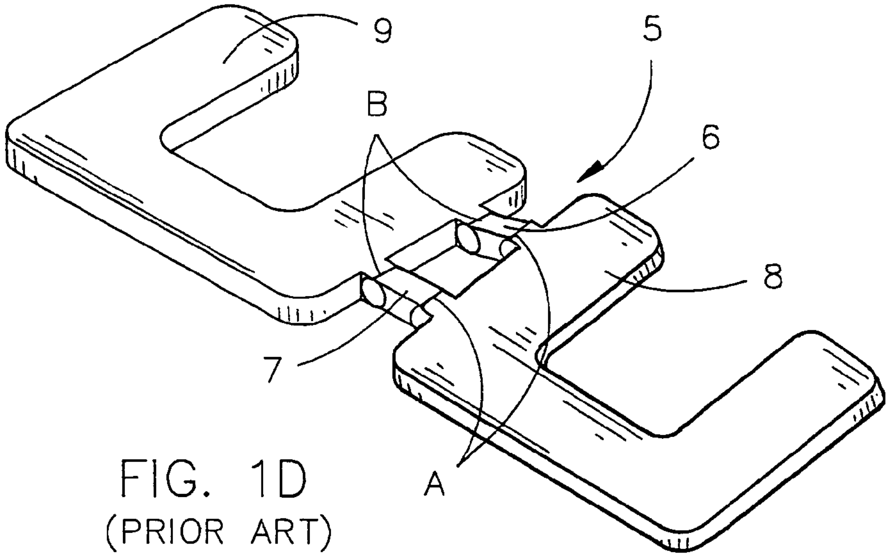
FIG. 1D (PRIOR ART)
FIG. 1D is an isometric view of the prior art components and carrier of FIG. 1C where the components are slightly twisted with respect to one another.
Figure 1E:
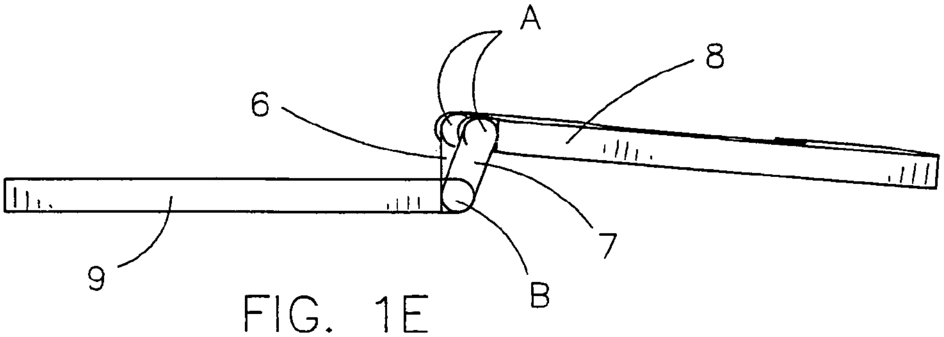
FIG. 1E (PRIOR ART)
FIG. 1E is an isometric view of the prior are components and carrier of FIG. 1D after additional twisting forces are exerted on the components.
Figure 2C:
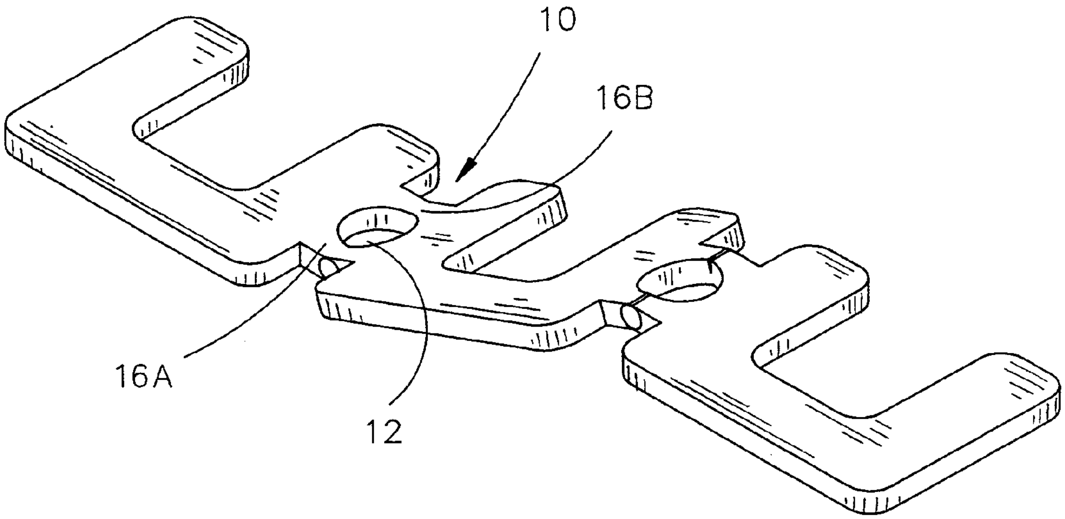
FIG. 2C is an isometric view of one embodiment of the perforated progressive die tooling component carrier of the present invention joining a plurality of components to one another during a bending operation.
Figure 2D:
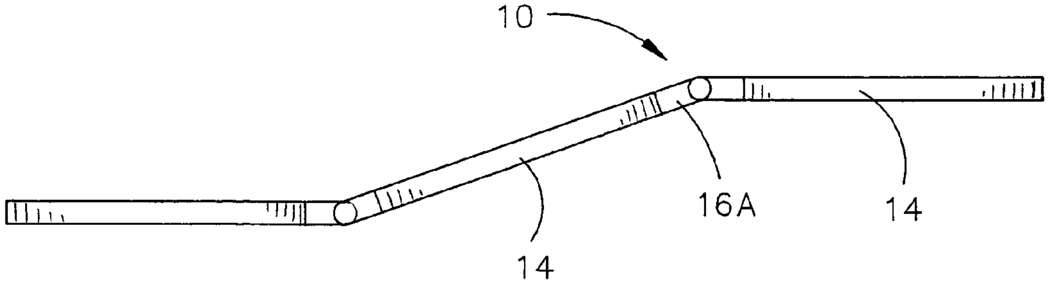
FIG. 2D is a side elevation view of the components and carriers of FIG. 2C.

The carriers 10 shown in FIG. 2A are ideally suited for reeling of the components for storage and transportation. Unlike prior art carriers, the carrier 10 will tend to bend or deflect at a single predetermined line indicated at 2B, which intersects the carrier arms 16A and 16B at the points of narrowest width, $W_A$ and $W_B$. Changing the shape of perforation 12, or its location in carrier 10, so that the narrowest width portions $W_A$ and $W_B$ are moved to different locations along the length of carrier 10, will selectively change the location of the carrier hinge. By bending the carrier at the line 2B, the base 19 of the components 14 are maintained in a substantially flat condition. Accordingly, a single hinge with a single axis is selectively located and maintained in carrier 10 throughout a reeling operation as depicted in FIGS. 2C and 2D. Prior art carriers using parallel carrier arms of uniform width will tend to twist and form two different hinges in the carrier with different axes as shown in FIGS. 1D and 1E, putting a greater stress on the carrier and rendering precision work with such a carrier difficult at best.

Although perforation 12 can be formed in virtually any shape, it is preferred that perforation 12 at least be shaped to provide carrier arms 16A and 16B with curved inner edges, extending at least partially along the length of carrier 10. The curved inner edges will provide the requisite narrow width portions $W_A$ and $W_B$. They will also tend to provide greater structural integrity to the hinge formed in the carrier 10 than edges having an angular shape.

Figure 3A:
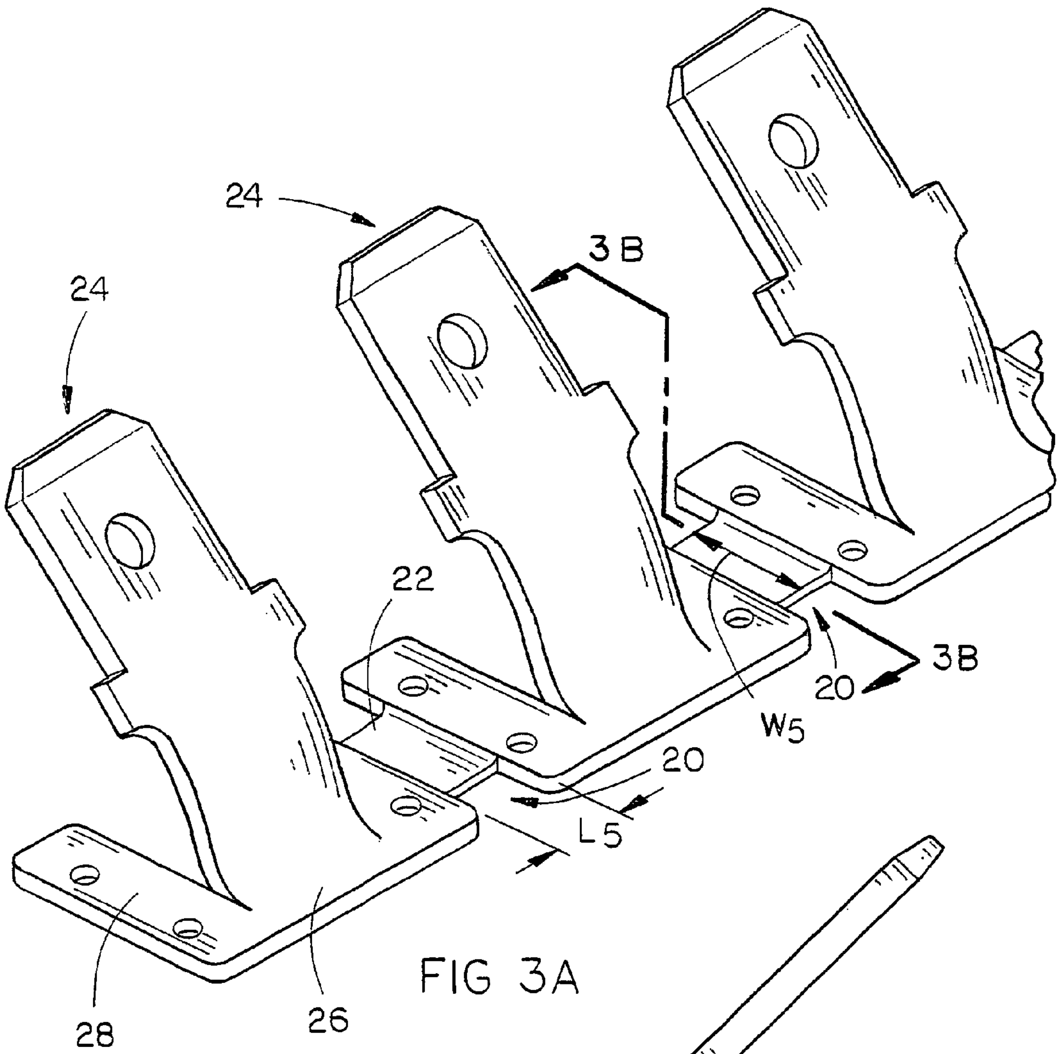
FIG. 3A is an isometric view of a series of components joined by progressive die tooling component carriers of this invention employing a compression.
Figure 3B:
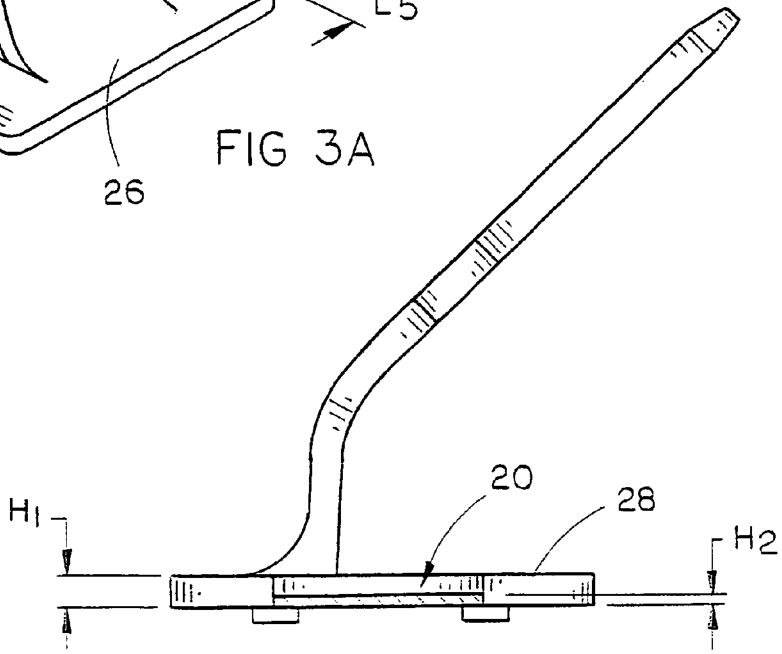
FIG. 3B is a side sectional view of the same.

A second embodiment of the carrier of this invention is shown in FIGS. 3A and 3B and is indicated by numeral 20. The carrier 20 has been shaped to have a compression 22 extending across the width ($W_5$) thereof. The compression 22 is perpendicular to the longitudinal axis of the components 24 and reduces the thickness ($H_2$) of the carrier 20 relative to the thickness ($H_1$) of the components 24. It is contemplated that the reduced thickness of the carrier 20 could be achieved by the removal of material by known means or by compression. Although the width ($W_5$) of the carrier 20 is greater than that of the narrowest part of the component 26, the carrier 20 will provide a single hinge connection between components 24. Accordingly, only one hinge axis can be formed along the length of the carrier. The compression 22 provides a natural bending point at the line indicated by line 3B. In use, the components 24 may be reeled and the base 28 of each component 24 will be maintained in a substantially flat condition.

Due to compression 22, the carrier 20 may have a length ($L_5$) that is comparatively short, but that provides the desired hinge connection. The shortened length ($L_5$) results in less material that needs to be separated from the components 24, minimizing waste.

Figure 4A:
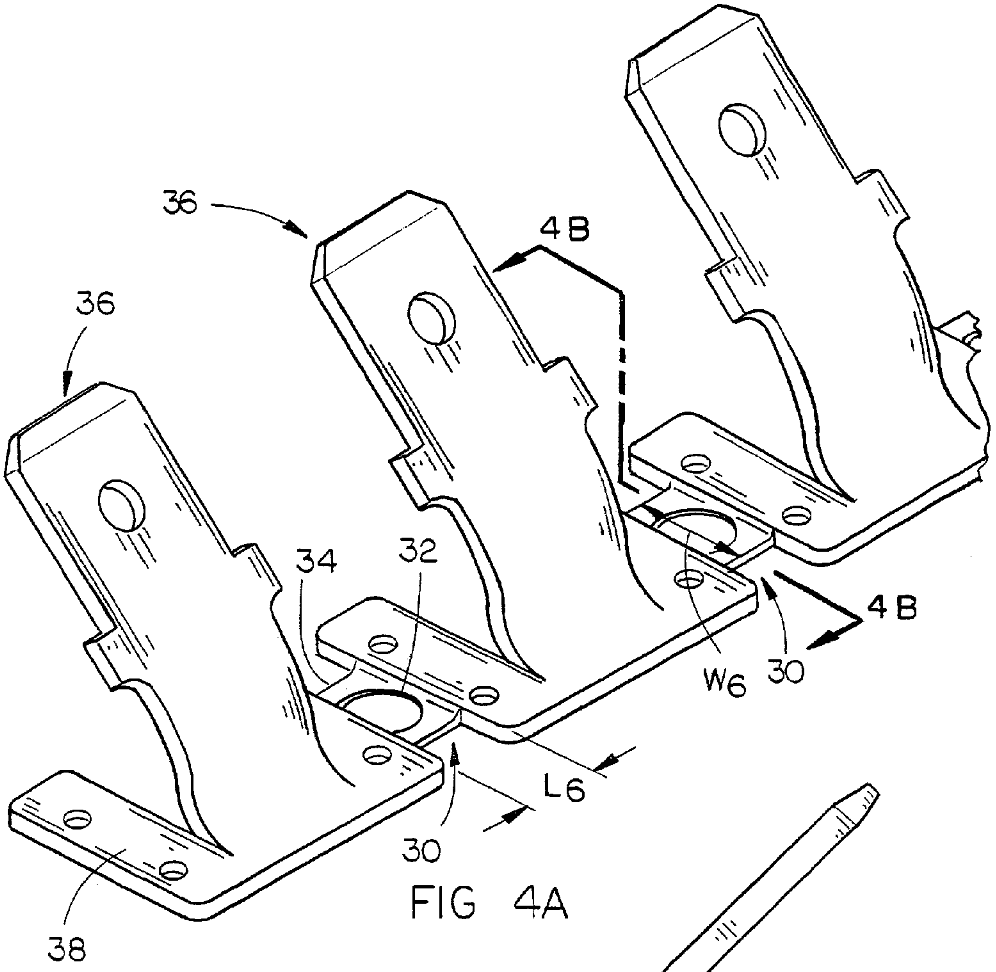
FIG. 4A is an isometric view of a series of components joined by progressive die tooling component carriers of this invention employing both a perforation and a compression.
Figure 4B:
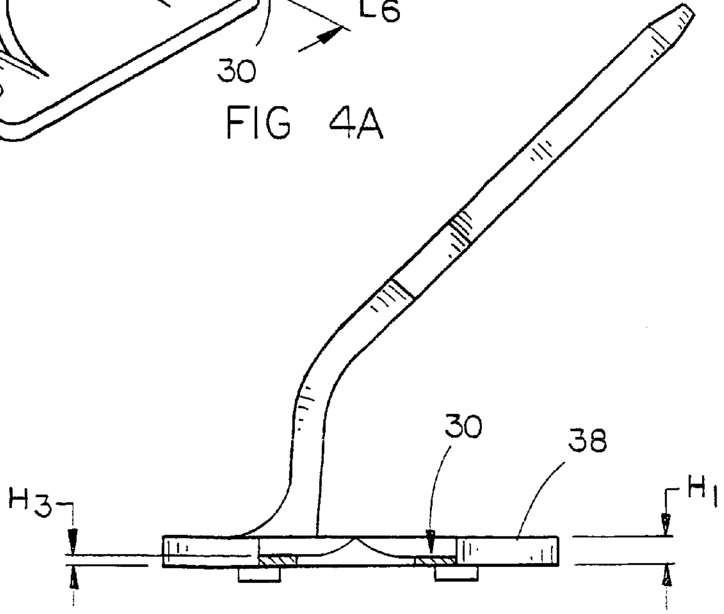
FIG. 4B is a side sectional view of the same.

A third embodiment of the carrier 30 of this invention is shown in FIGS. 4A and 4B. The carrier 30 has a length ($L_6$), an overall width ($W_6$), a perforation 32, and a compression 34. The carrier 30 employs the benefits of carriers 10 and 20 previously described. The perforation 32 provides a hinge connection between components 36 and also minimizes waste material. As shown in FIG. 4B, the compression 34 has a thickness ($H_3$) that is less than the thickness ($H_1$) of the base portion 38 of the component 36. The compression 34 extends across the width ($W_6$) of the carrier 30 and also provides a hinge connection between components 36. Like the previously described carriers 10 and 20, the carrier 30 allows for the reeling of components 36 while maintaining the base portion 38 of the components in a substantially flat condition. The carrier 30 also consists of less material than prior art carriers, minimizing waste caused by separation of the carrier 30 from the components 36.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

What is claimed is:

1. A method of using progressive die tooling, comprising:

forming at least a first component and a second component and a tab that extends between said first component and said second component; said tab having a length, which extends between a first end portion that is coupled with said first component and a second end portion that is coupled with said second component, and a width that is perpendicular to said length;

forming said tab with means that resists the unintentional formation of multiple hinge axes between said first component and said second component when said first component and second component are moved with respect to one another; said means being comprised of a compressed cross-sectional height formed in said tab that facilitates the formation of a hinge intermediate the first and second end portions of said tab when said first component and said second component are wound about a common axis;

causing a first movement of said first component, with respect to said second component in a first direction, such that said tab bends to form a hinge along a first axis in said tab between said first and second end portions; and causing a second movement of said first component, with respect to said second component in a second direction, such that said tab bends again at said hinge along said first axis.

2. The method of claim 1 further comprising:

shaping said tab to have a width sufficient to substantially prevent the tab from twisting about an axis extending parallel to its length.

3. A method of using progressive die tooling, comprising:

forming at least a first component and a second component and a tab that extends between said first component and said second component; said tab having a length, which extends between a first end portion that is coupled with said first component and a second end portion that is coupled with said second component, and a width that is perpendicular to said length;

forming said tab with means that resists the unintentional formation of multiple hinge axes between said first component and said second component when said first component and second component are moved with respect to one another; said means being comprised of a perforation formed in said tab, intermediate said first and second end portions, that facilitates the formation of a hinge intermediate the first and second end portions of said tab when said first component and said second component are wound about a common axis;

causing a first movement of said first component, with respect to said second component in a first direction, such that said tab bends to form a hinge along a first axis in said tab between said first and second end portions; and causing a second movement of said first component, with respect to said second component in a second direction, such that said tab bends again at said hinge alone said first axis.

4. The method of claim 3 wherein said perforation forms first and second carrier arms, each having a length and a width that varies along the length.

5. The method of claim 3 wherein said perforation forms first and second carrier arms having generally curved inner edge portions extending at least partially along the length of said tab.

6. A method of using progressive die tooling, comprising:

forming at least a first component and a second component and a tab that extends between said first component and said second component; said tab having a length, which extends between a first end portion that is coupled with said first component and a second end portion that is coupled with said second component, and a width that is perpendicular to said length;

forming said tab with means that resists the unintentional formation of multiple hinge axes between said first component and said second component when said first component and second component are moved with respect to one another; said means being comprised of forming said tab to have a cross-sectional height that is comparatively thinner than cross-sectional heights of said first component and said second component to facilitate the formation of a hinge intermediate the first and second end portions of said tab when said first component and said second component are wound about a common axis;

causing a first movement of said first component, with respect to said second component in a first direction, such that said tab bends to form a hinge along a first axis in said tab between said first and second end portions; and causing a second movement of said first component, with respect to said second component in a second direction, such that said tab bends again at said hinge along said first axis.

7. A method of using progressive die tooling, comprising:

forming at least a first component and a second component and a tab that extends between said first component and said second component; said tab having a length, which extends between a first end portion that is coupled with said first component and a second end portion that is coupled with said second component, and a width that is perpendicular to said length;

forming said tab with means that resists the unintentional formation of multiple hinge axes between said first component and said second component when said first component and second component are moved with respect to one another; said means being comprised of forming said tab to have a cross-sectional height that is comparatively thinner than cross-sectional heights of said first component and said second component to facilitate the formation of a hinge intermediate the first and second end portions of said tab when said first component and said second component are wound about a common axis; said means being further comprised of a perforation formed through said tab intermediate its first and second end portions;

causing a first movement of said first component, with respect to said second component in a first direction, such that said tab bends to form a hinge along a first axis in said tab between said first and second end portions; and causing a second movement of said first component, with respect to said second component in a second direction, such that said tab bends again at said hinge along said first axis.

8. A method of using progressive die tooling, comprising:

forming at least a first component and a second component and a tab that extends between said first component and said second component; said tab having a length, which extends between a first end portion that is coupled with said first component and a second end portion that is coupled with said second component, and a width that is perpendicular to said length;

forming said tab with means that resists the unintentional formation of multiple hinge axes between said first component and said second component when said first component and second component are moved with respect to one another;

causing a first movement of said first component, with respect to said second component in a first direction, such that said tab bends to form a hinge along a first axis in said tab between said first and second end portions;

causing a second movement of said first component, with respect to said second component in a second direction, such that said tab bends again at said hinge along said first axis; and providing means for reducing scrap when the carrier is separated from said first component and said second component.

9. A method of using progressive die tooling, comprising:

forming at least a first component and a second component and a tab that extends between said first component and said second component; said tab having a length, which extends between a first end portion that is coupled with said first component and a second end portion that is coupled with said second component, and a width that is perpendicular to said length;

forming said tab with means that resists the unintentional formation of multiple hinge axes between said first component and said second component when said first component and second component are moved with respect to one another;

causing a first movement of said first component, with respect to said second component in a first direction, such that said tab bends to form a hinge along a first axis in said tab between said first and second end portions; and causing a second movement of said first component, with respect to said second component in a second direction, such that said tab bends again at said hinge along said first axis;

said first and second movements being caused when said first component and said second component are wound about a common axis and unwound about said common axis.

10. The method of claim 9 wherein said means is comprised of a compressed cross-sectional height formed in said tab that facilitates the formation of a hinge intermediate the first and second end portions of said tab when said first component and said second component are wound about a common axis.

11. A method of using progressive die tooling, comprising:

forming at least a first component and a second component and a tab that extends between said first component and said second component; said tab having a length, which extends between a first end portion that is coupled with said first component and a second end portion that is coupled with said second component, and a width that is perpendicular to said length;

forming said tab with means that resists the unintentional formation of multiple hinge axes between said first component and said second component when said first component and second component are moved with respect to one another;

causing a first movement of said first component, with respect to said second component in a first direction, such that said tab bends to form a hinge along a first axis in said tab between said first and second end portions;

causing a second movement of said first component with respect to said second component in a second direction, such that said tab bends again at said hinge along said first axis; and causing a third movement of said first component, with respect to said second component in a first direction, such that said tab bends again at said hinge along said first axis.

12. A method of using progressive die tooling, comprising:

forming at least a first component and a second component and a tab that extends between said first component and said second component; said tab having, a length, which extends between a first end portion that is coupled with said first component and a second end portion that is coupled with said second component, and a width that is perpendicular to said length;

forming said tab with means that resists the unintentional formation of multiple hinge axes between said first component and said second component when said first component and second component are moved with respect to one another;

causing a first movement of said first component, with respect to said second component in a first direction, such that said tab bends to form a hinge along a first axis in said tab between said first and second end portions;

causing a second movement of said first component, with respect to said second component in a second direction, such that said tab bends again at said hinge along said first axis;

forming said tab with means for minimizing waste when said tab is removed from said first component and said second component; and removing said tab from said first component and said second component such that said tab is converted into waste, deposited in a first location.

13. The method of claim 12 further comprising:

removing said waste from said first location using a vacuum.

* * * * *